Patented Mar. 23, 1948

2,438,288

UNITED STATES PATENT OFFICE 2,438,288

APPARATUS FOR DETERMINING BALANCE IN AN ELECTRICAL NETWORK

Abraham Walter Jacobson, New Haven, and Elliott M. Whitney, Woodbury, Conn., assignors to The Bristol Company, Waterbury, Conn., a corporation of Connecticut Application January 3, 1945, Serial No. 571,176

15 Claims. (Cl. 318—28)

1

This invention relates to electrical bridge systems, and more especially to an alternating-current Wheatstone bridge circuit adapted to the determination of resistance values, or, when provided with an arm having a predetermined resistance/temperature characteristic, to the measurement of temperature. In the determination of resistance (or temperature) values with a bridge system, it is customary to have three arms of a Wheatstone bridge network incorporated in a unitary instrument structure, while the fourth, or variable, arm may be located at some distance therefrom and interconnected with the other elements of the network by means of suitable electrical conductors. In many instances, especially where self-balancing mechanisms are involved, it is desirable that such bridge systems be operated from an alternating-current supply, enabling the unbalance potential to be readily amplified for the control of a balancing motor. Also, in bridge circuits wherein, due to electrolytic or thermoelectric effects, or other causes, there exists an unavoidable unidirectional electromotive force independent of the value under measurement, such measurement can often be performed, without interference from said electromotive force, by the expedient of utilizing alternating current in the network whose balanced condition is a factor in the determination of the unknown variable.

In bridges where one arm is included in a loop external to the part of the network which may expediently be shielded from stray magnetic or electrostatic fields, as in the case of a resistance thermometer having its "bulb" located some distance from the other elements of the bridge, it is not unusual for such fields, if alternating in their nature, to induce in such a loop alternating electromotive forces which, being superimposed upon those normal to the network, serve to falsify the balance and impair the accuracy of measurement to an extent depending upon the magnitude of the disturbing field and its phase relation with respect to the potentials normally existing in the bridge, as well as upon the degree of exposure of the bridge circuit to the stray field. In addition to these vitiating influences, commonly comprehended under the term of "pick-up," there often exists the possibility of leakage of alternating potentials through insufficiently insulated conductors into the measuring network.

2

It is an object of the present invention to provide a bridge system adapted to operation on power supplied at "commercial" frequencies, and in which parasitic voltages at these frequencies introduced into the network will not have any effect on the measurements performed by the bridge system.

It is a further object to provide such a system in which unbalance potentials developed in the bridge network may readily be amplified for the purpose of detection or of operating a rebalancing motor in a direction, and with an intensity, corresponding to those of the unbalance condition.

It is a further object to provide a system of the above class adapted to the use of a servomotor of an inexpensive standard type operable on alternating current of "commercial" frequency.

It is a further object to provide a bridge system with an output adapted to the operation of an alternating-current motor having two windings, one of which is continuously excited at a fundamental frequency, said output being characterized by the presence of two components, one having fundamental frequency and adapted to develop a torque in said motor in a sense to actuate bridge-balancing instrumentalities, and the other having a second-harmonic frequency and adapted to retard the operation of said motor, said components having the inherent tendencies that, whereas that of fundamental frequency tends to decrease, that of double frequency tends to increase, as a condition of bridge balance is approached.

In carrying out the purposes of the invention it is proposed to utilize in a bridge system two alternating voltages having widely different frequencies which may be designated as $\omega$ and $\phi$ (e. g., 60 cycles and 1650 cycles per second). By combining these in a suitable modulator circuit there is obtained a voltage having components at the frequencies $(\phi+\omega)$ and $(\phi-\omega)$. A voltage at a frequency $\phi$ may be applied to the bridge network proper. The output of the bridge, representing the degree of unbalance, and having the frequency of the bridge input, is then combined by means of a suitable circuit with the voltage having components at the frequencies $(\phi+\omega)$ and $(\phi-\omega)$. The combined voltage, when minal of the battery 39 through the secondary winding of a transformer 41. The plates of the triodes 35—36 are interconnected through the primary winding of a transformer 42 having a mid-tap which is connected to the positive terminal of the battery 39 through the primary of a transformer 43. The primary of transformer 40 is connected to input terminals 45, to which, in turn, is applied from the transformer 16 an adjustable voltage having the frequency ω. The primary of the transformer 41 is connected to input terminals 46, to which is applied from the oscillator 17 a voltage having the frequency φ. The secondary of transformer 42 is connected to output terminals 47, and the secondary of transformer 43 to output terminals 48, across which is bridged a filter network 49 sharply tuned to bypass components of all frequencies excepting φ.

By proper selection, proportioning and arrangement of the elements of the system, the circuit comprehended in the modulator 11 provides means whereby there may be obtained at the output terminals 47 a voltage having the frequency components (φ+ω) and (φ—ω), the carrier frequency φ being suppressed at these terminals, but appearing at the terminals 48.

The amplifier 12 includes an adjustably tapped resistor 51 across which is bridged a suitable filter network 52. A triode 53 having a cathode, an anode and a control grid, is arranged in a conventional manner with said cathode connected through a suitable resistor 54 and bypass condenser 55 to the negative terminal of a battery 56 or equivalent direct-current source, and also to a conductor 57 maintained at ground potential and connected to one terminal each of the resistor 51 and the filter network 52. The control grid of the triode 53 is connected to the adjustable tap on the resistor 51. The anode or plate of the triode 53 is connected through a suitable filter network 60 to the positive terminal of the battery 56, and also through a blocking condenser 61 and an adjustably tapped resistor 62 to the conductor 57. Also included in the same assembly but not necessarily forming a part of the true amplifier, is a filter network 63 tuned to bypass components of all frequencies excepting those within the band (φ±ω), and in parallel therewith an adjustably tapped voltage-diving resistor 64, the combination of said filter and resistor having one common terminal connected to the conductor 57.

One each of the terminals 47 of the balanced modulator and the terminals 31 of the bridge assembly are together connected to a conductor 65, and thereby to the conductor 57 in the amplifier assembly. The free terminals of the resistor 51 and filter 52 are connected by means of a common conductor 66 to the free terminal of the pair 31 in the bridge assembly; and the free common terminal of the filter 63 and resistor 64, by means of a conductor 67 to the free terminal of the pair 47 in the balanced modulator assembly 11.

Included in the adder 13 is a multi-electrode vacuum tube 70 of the type having, in addition to an electron-emissive cathode and an anode or plate, two separate control grids mutually shielded, permitting each to act independently on the electron stream, as well as a suppressor grid to inhibit the undesirable effects of secondary emission from the anode. That form of tube known in the electronic art as "6L7–G" has been found well suited to this purpose, and is so shown in the drawing. The cathode of the vacuum tube 70 is connected through a suitable resistor 71 in parallel with a bypass condenser 72 to the conductor 57 which is carried through from the amplifier 12, and also to the negative terminal of a battery 73, or equivalent direct-current source. The two control grids of the vacuum tube 70 are connected to the adjustable taps on the voltage dividers 62—64 respectively in the amplifier 12. The anode of said tube is connected through a suitable filter network 74 to the positive terminal of the battery 73, and also through a blocking condenser 75 in series with a voltage-dividing resistor 76 having an adjustable tap thereon to the conductor 57. The shielding grids of the tube 70 are connected through a resistor 77 to the positive terminal of the battery 73 and through a capacitor 78 to the conductor 57. It will be seen that by suitable selection and proportioning of the elements of the amplifier 12 and the adder 13, there may be made to appear across the voltage dividing resistor 76 a voltage resolvable into components at the frequences φ, (φ+ω), and (φ—ω), these components being derived from the output terminals 47 of the modulator 11 and the output terminals 31 of the bridge 10. By suitably adjusting the voltage divider 62, across which appears a voltage at the frequency φ, and also adjusting the voltage divider 64, across which appears a voltage resolvable into components at the frequencies (φ±ω), the relative magnitudes of these frequency components in the potential across the voltage divider 76 may be regulated. By tuning the several filter networks of the amplifier 12 and the adder 13 to suppress any unwanted frequency components arising from non-linearity in tube characteristics, the voltage output of the adder 13 may be rendered substantially free of components having any frequencies other than φ and (φ±ω).

The demodulator 14 includes a triode 80 having a cathode, an anode or plate, and a control grid, arranged with said cathode connected through a suitable resistor 81 in parallel with a condenser 82 to the conductor 57 which is carried from the amplifier and the adder, and thereby to the negative terminal of a suitable battery or equivalent direct-current source 83. The control grid of the triode 80 is connected to the adjustable tap on the potential divider 76 in the adder 13.

The anode of the triode 80 is connected through a resistor 84 to the positive terminal of the battery 83, and also through a blocking condenser 85 and a tapped voltage-dividing resistor 86 to the conductor 57. In parallel with the resistor 86 is connected a filter network 87 tuned to bypass all frequencies excepting ω (that of the supply source 34) and its second harmonic 2ω.

The primary function of the adder 13 and the demodulator 14 is to make possible the utilization of the high-frequency output of the bridge and amplifier to control the operation of a balancing motor 26 of a conventional type and operating at a commercial frequency. The multi-electrode tube 70 provides a means of "adding" frequency components of voltage derived from two sources without appreciable coupling between said sources. (Hence it may be said that the tube is used as a "linear mixer" or "adder".) In the output of the tube 70 there will exist a voltage having the frequency components φ and (φ±ω). Any other frequency components will be eliminated by the filter network 74. From a voltage wave thus composed there may be obtained by use of the demodulator 14 a voltage at the frequency ω, and/or the frequency 2ω, among others, depending upon the relative amplitudes of the input components.

The presence of the voltage component having the frequency $2\omega$, and its variation with the degree of bridge unbalance, is explained on the basis of relative proportion of carrier and sideband frequencies existing in the output of the adder tube. As the relative value of these components changes, the degree of modulation varies to a corresponding extent. When the amplitude of each side-band component is equal to half that of the carrier, the wave is said to have 100% modulation; and from such a wave, when demodulated, may be retrieved the maximum possible component having the fundamental frequency $\omega$. If modulation is less than 100%, demodulation produces a component of fundamental frequency but of correspondingly less amplitude. When modulation becomes greater than 100%, i. e., when the amplitude of each side-band component is greater than half that of the carrier, then upon demodulation a second-harmonic component of the fundamental frequency $\omega$ will appear in the output. Thus, through the ranges of values between 100% modulation and that condition where the carrier disappears entirely, the demodulated wave will contain components of voltage at the fundamental frequency $\omega$ and the second harmonic frequency $2\omega$, varying from a maximum to zero in the former instance and from zero to a maximum in the latter instance, respectively.

Thus in the operation of the bridge circuit on a voltage at the frequency $\phi$, when the bridge is balanced, there will appear in the output of the demodulator a maximum component of voltage at the frequency $2\omega$ and a zero component of voltage at the fundamental frequency $\omega$. As the bridge network proper departs from a balanced condition, there will appear through the "adder" a component having the frequency $\phi$, varying in amplitude with the extent of unbalance and subject to a 180° phase shift with change in the direction of unbalance. A corresponding voltage at the frequency $\omega$ will appear across the output terminals of the demodulator; and, as pointed out, there will also be present a component at the frequency $2\omega$, which varies in amplitude inversely as the amplitude of the fundamental frequency component.

The power amplifier 15 may be of any conventional form, of which many are known to the art, and, having its input terminals connected to the tapped-off portion of the voltage-dividing resistor 86 in the demodulator 14 and its output terminals to the winding 33 of the balancing motor, will provide in said winding a current corresponding to the potential of the demodulator output.

With the arrangement of circuits shown in Fig. 1, wherein the bridge network is energized at the carrier frequency $\phi$ (said network being purely linear in its characteristics) the output of the bridge, representing the unbalance, will also have the frequency $\phi$, and will shift phase by 180°, depending upon the direction of unbalance. Thus, with changes in the balance condition of the bridge network, there will flow in the winding 33 a current representative of the balance; and the magnetic effects of that current, combining with those of the alternating current in the continuously energized winding 32, will cause the motor to operate in a direction, and with a torque, dependent upon the unbalance of the bridge, and to translate the movable contact 21 along the slide-wire 20 in a sense to restore a balanced condition.

The use of a voltage at the carrier frequency $\phi$ to energize the bridge network, and the addition to the bridge output of a voltage having the frequency components $(\phi+\omega)$ and $(\phi-\omega)$ by means of the adder or "linear mixer" 13 makes possible the recovery of a voltage at the "commercial frequency" $\omega$, whose phase is subject to a change of 180° depending upon the direction of unbalance of the bridge network, for operation of the rebalancing motor. Servomotors of the type hereinbefore described will respond only to a voltage across the control coil of the same frequency that is applied across the field coil; voltages at other frequencies across the control coil do not contribute to the motor rotation. By tuning filter 74, to pass only voltages at the frequencies $\phi$, $(\phi+\omega)$, and $(\phi-\omega)$ any alternating current pick-up in the bridge network at frequencies outside this range will not cause the motor to rotate. Thus is eliminated the undesirable effect of "pick-up" in alternating current bridge networks.

Filters other than 74 shown in Fig. 1 are sometimes added in practice for the following reasons: filter 49 operates to eliminate those voltage components at frequencies other than $\phi$, which are inherently developed in the balanced modulator, from the bridge network; filter 63 operates to eliminate those voltage components at frequencies other than $\phi+\omega$ and $\phi-\omega$ which are inherently developed in the balanced modulator in order that more nearly linear mixing will be assured in tube 70. Filters 52 and 60 operate to assure more nearly linear operation of the amplifying network 12; while filter 87 operates to eliminate high frequency components from the power amplifier and by its tuning to give another means of adjusting the proportions of $\omega$ and $2\omega$ fed to the power amplifier.

It has been found that, in certain types of self-balancing systems wherein the balancing action is obtained by means of a small two-phase servomotor having one winding continuously excited, and the other energized according to the unbalance of a network, improved damping of the motor action is obtained by superimposing upon the variable alternating energizing potential, components at frequencies other than fundamental, particularly the second harmonic and having these latter components increase in amplitude as balance is approached while at the same time the fundamental component will be decreasing in amplitude as balance is approached. Such a performance may be obtained in the system as shown in Fig. 1, and hereinbefore described, by tuning the filter 87 in the demodulator 14 to provide at the output terminals of the demodulator a voltage having not only the basic frequency $\omega$, but also a component of double frequency $2\omega$, which, as hereinbefore pointed out, is inherently present in the output of the demodulator 14 under the conditions stated. Adjustment of the resistors 51, 62, and 64 serves to alter the sensitivity and point of unbalance at which the double frequency component appears; while adjustment of filter 87 serves to proportion the relative amounts of the basic frequency and double frequency components fed to the power amplifier for any given unbalance. The utilization of a double frequency component for improving the performance of an alternating-current servomotor is fully set forth and explained in co-pending application Serial No. 548,820, filed August 10, 1944, by A. W. Jacobson, one of the present inventors, and need not here be more fully described.

In Fig. 2 is shown an alternative arrangement of circuits involving the principle of the invention. The physical arrangement differs from that shown in Fig. 1, solely in an interchange of the types of current internal, and external, to the bridge network. The input terminals 30 of the bridge network shown in Fig. 1 are transferred from the output terminals 48 to the output terminals 47 of the modulator 11. The output terminals 31 of the bridge remain connected to the conductors 65 and 66, but that connected to the former of these conductors is transferred from one of the modulator output terminals 47 to one of the terminals 48, the other of said last-named pair of terminals being connected to the conductor 67. With this arrangement, the bridge network will be energized by, and will have an output characterized by, a potential resolvable into components at the frequencies $(\phi+\omega)$ and $(\phi-\omega)$. The filters 52 and 60 of the amplifier will, in this embodiment, be tuned to eliminate from the amplifier output all frequencies other than those in the band $(\phi\pm\omega)$; while filter 63 will be tuned to eliminate all frequencies other than $\phi$. The frequencies $\phi\pm\omega$ will be applied to one control grid of the adder tube 70, while a voltage at the frequency $\phi$ will be applied to the other control grid. The output of the adder will thus contain a voltage resolvable into a component at the carrier frequency $\phi$ and components at the frequencies $(\phi+\omega)$ and $(\phi-\omega)$, the latter components varying with conditions in the bridge network. The output of the adder being applied to the demodulator 14, there will appear at the output terminals of the latter a voltage of frequency $\omega$, variable in phase position and in amplitude with unbalance in the bridge network, and adapted to operation of the motor 26 in a sense to restore a balanced condition. Analysis of conditions existing in the system of connections shown in Fig. 2 will show, however, that the performance differs from the arrangement of Fig. 1 in the one distinct feature of the double frequency component being absent from the voltage applied to the motor terminals as balance is approached. While it may be made to appear with extreme unbalance this condition is, generally, to be avoided in practice.

While the principles of the invention have been set forth in their application to a motor-actuated self-balancing apparatus, it is understood that they are also applicable to the detection of a condition of unbalance for the purpose of manual rebalancing or for automatic control where for any reason the use of a two-phase motor such as the unit 26 in Fig. 1 may not be practicable. In Fig. 3 is shown an electrodynamic instrument 90 having a stationary coil 91, and magnetically interacting therewith a pivoted movable coil 92, carrying an index or pointer 93 adapted to cooperate with a scale 94 to provide an indication of the deflected position of said movable coil. The assembly of the pivoted coil 92 and the pointer 93 is constrained in a neutral position by spring means not shown in the drawing, whereby the index 93 will normally rest in a central position with respect to the scale 94, and will be deflected to the right or to the left according to the relative instantaneous polarity of currents flowing in the stationary and movable coils respectively. The pointer 93 may if desired be fitted with an electrical contact 95 adapted to coact alternatively with stationary contacts 96—97 for purposes of electrical control where for some reason the use of a two-phase motor as indicated in Fig. 1 is inexpedient. The stationary coil 91 is connected in series with a suitable current-limiting resistor 98 to a source of alternating current of commercial frequency, corresponding to the source 34 in Fig. 1; and the movable coil 92 through suitable flexible leads to the output terminals of the power amplifier 15 in Fig. 1, whereby the deflections of the coil 92 and attached pointer 93 from the center zero of reference on the scale 94 will correspond in all respects to the rotation of the motor 26 in Fig. 1, enabling the instrument 90 to be utilized as a detector of unbalance for the purpose of manually rebalancing the bridge, or as a controlling instrument for effecting automatic regulation or for accomplishing other control functions.

Though for purposes of simplicity the vacuum tubes 35, 36, 53, and 80 have been indicated and described as triodes, it is fully appreciated that, without departing from the spirit of the invention, any or all of these may (with concomitant modifications in associated circuits) be replaced by tetrodes, pentodes, or other forms of well-known multi-electrode tubes, thus providing such advantageous performance as may characterize the use of such devices. On the other hand, the functions of a plurality of tubes may at times be incorporated within a single evacuated envelope; as, for example, the two similar tubes 35 and 36 could expediently be replaced by a single multi-electrode tube of the type known as a "twin triode."

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In combination, a balanceable electrical network comprising a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from one of said sources to said network, means for mixing potential from the other of said sources with potential from said bridge arm to produce a mixed voltage, together with demodulating means to retrieve from said mixed voltage a component having said relatively low frequency and of amplitude and phase position depending upon the condition of balance in said network.

2. In combination, a balanceable electrical network comprising a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from the first of said sources to said network, means for mixing potential from the second of said sources with potential from said bridge arm to produce a mixed voltage, together with demodulating means to retrieve from said mixed voltage a component having said relatively low frequency and of amplitude and phase position depending upon the condition of balance in said network.

3. In combination, a balanceable electrical network comprising a plurality of branches and a bridge arm interconnected therewith to have between its terminals a potential dependent upon the degree of electrical unbalance existing among said branches, two sources of alternating potential one having a relatively high frequency, and the other comprising side bands derived from said frequency as a carrier modulated by a relatively low frequency, means for applying potential from the second of said sources to said network, means for mixing potential from the first of said sources with potential from said bridge arm to produce a mixed voltage together with demodulating means to retrieve from said mixed voltage a component having said relatively low frequency and of amplitude and phase position depending upon the condition of balance in said network.

4. In combination, a balanceable electrical network comprising a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from the first of said sources to said network, means for mixing potential from the second of said sources with potential from said bridge arm to produce a mixed voltage, together with means for deriving from said mixed voltage two components, one having said relatively low frequency and of amplitude and phase position depending upon the condition of balance in said network, and the other being a harmonic of said low frequency and having an amplitude variation with change in said balance condition but in sense opposite to that of said low frequency component.

5. In combination, a balanceable electrical network comprising a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from one of said sources to said network, means for mixing potential from the other of said sources with potential from said bridge arm to produce a mixed voltage, filter means for restricting the output of said mixing means substantially to components of said carrier frequency and said side band frequencies, together with demodulating means to retrieve from said mixed voltage a component having said relatively low frequency and of amplitude and phase position depending upon the condition of balance in said network.

6. In combination, a balanceable electrical network comprising a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from one of said sources to said network, means for mixing potential from the other of said sources with potential from said bridge arm to produce a mixed voltage, filter means for restricting the output of said mixing means substantially to components of said carrier frequency and said side band frequencies, together with demodulating means to retrieve from said mixed voltage a component having said relatively low frequency and of amplitude and phase position depending upon the condition of balance in said network, and filter means for restricting the output of said demodulating means substantially to components of said low frequency and a harmonic thereof.

7. In combination, a balanceable electrical network comprising a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from one of said sources to said network, means for amplifying the output potental from said bridge arm, filter means for restricting the output potential from said amplifying means to the frequency applied to said network, means for mixing potential from the other of said sources with potential from said amplifying means to produce a mixed voltage, and demodulating means to retrieve from said mixed voltage a component having said relatively low frequency and of amplitude and phase position depending upon the condition of balance in said network.

8. In combination, a balanceable electrical network comprising a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from one of said sources to said network, means for amplifying the output potential from said bridge arm, filter means for restricting the output potential from said amplifying means to the frequency applied to said network, means for mixing potential from the other of said sources with potential from said amplifying means to produce a mixed voltage, means for varying the relative magnitudes of the potentials applied to said mixing means to provide greater than 100% modulation of said carrier, and demodulating means for retrieving from said mixed voltage two components, one having said relatively low frequency and of amplitude and phase position depending upon the condition of balance in said network, and the other being a harmonic of said low frequency and having an amplitude variation with change in said balance condition but in sense opposite to that of said low frequency component.

9. In combination, a balanceable electrical network having a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from the first of said sources to said network, means for mixing potential from the second of said sources with potential from said bridge arm to produce a mixed voltage, means for deriving from said mixed voltage two components, one having said relatively low frequency and of amplitude and phase position depending upon the condition of balance in said network, and the other being a harmonic of said low frequency and having an amplitude variation with change in said balance condition but in sense opposite to that of said low frequency component, and electromotive means operable in accordance with the magnitude and direction of said unbalance condition, said electromotive means comprising a pair of windings, one adapted for energization by alternating current of said relatively low frequency, and the other adapted to receive said components derived from said mixed voltage.

10. A self-balancing bridge system comprising an electrical network having a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from the first of said sources to said network, means for mixing potential from the second of said sources with potential from said bridge arm to produce a mixed voltage, means for deriving from said mixed voltage two components, one having said relatively low frequency and of amplitude and phase position depending upon the condition of balance in said network, and the other being a harmonic of said low frequency and having an amplitude variation with change in said balance condition but in sense opposite to that of said low frequency component, and balancing means for said network comprising a motor having a pair of windings, one adapted for energization by alternating current of said relatively low frequency, and the other adapted to receive said components derived from said mixed voltage.

11. In combination, a balanceable electrical network having a plurality of branches and a bridge arm interconnected therewith to have between its terminals a potential dependent upon the degree of electrical unbalance existing among said branches, two source of alternating potential one having a relatively high frequency and the other comprising side bands derived from said frequency as a carrier modulated by a relatively low frequency, means for applying potential from one of said sources to said network, means for mixing potential from the other of said sources with potential from said bridge arm to produce a mixed voltage, demodulating means for retrieving from said mixed voltage a component having said relatively low frequency and of amplitude and phase position depending upon the condition of balance in said network, and electromotive means operable in accordance with the magnitude and direction of said unbalance condition, said electromotive means comprising a pair of windings, one adapted for energization by alternating current of said relatively low frequency, and the other adapted to receive said component retrieved by said demodulating means.

12. In combination, a balanceable electrical network having a plurality of branches and a bridge arm interconnected therewith to have between its terminals a potential dependent upon the degree of electrical unbalance existing among said branches, two sources of alternating potential one having a relatively high frequency and the other comprising side bands derived from said frequency as a carrier modulated by a relatively low frequency, means for applying potential from one of said sources to said network, means for mixing potential from the other of said sources with potential from said bridge arm to produce a mixed voltage, demodulating means for retrieving from said mixed voltage a component having said relatively low frequency and of amplitude and phase position depending upon the condition of balance in said network, and an electrodynamometer comprising a stationary coil and a movable coil in the field of said stationary coil, one of said coils being adapted for energization by alternating current of said relatively low frequency and the other adapted to receive said component retrieved by said demodulating means.

13. In combination, a balanceable electrical network comprising a plurality of branches and a bridge arm interconnected therewith to have between its terminals a potential dependent upon the degree of electrical unbalance existing among said branches, a source of carrier frequency energizing potential, means for deriving from said carrier frequency energizing potential a second energizing potential having at least one component differing in frequency from said carrier frequency by a relatively low frequency increment, in the nature of a side band, means for applying one of said energizing potentials to said network, means for mixing at least said component of the other energizing potential with the potential from said bridge arm to produce a mixed voltage, together with demodulating means to retrieve from said mixed voltage a component having said relatively low frequency and of amplitude and phase position depending upon the condition of balance of said network.

14. In combination, a balanceable electrical network comprising a plurality of branches and a bridge arm interconnected therewith to have between its terminals a potential dependent upon the degree of electrical unbalance existing among said branches, a source of alternating potential, means deriving from the voltage output of said source, a first and a second potential, said first derived potential including at least a first frequency component and said second derived potential including at least one component differing in frequency from said first frequency component by a relatively small increment, means for applying one of said derived potentials to said network, means for mixing the other derived potential with potential from said bridge arm to produce a mixed voltage, together with demodulating means to retrieve from said mixed voltage a component having a frequency equal to said increment and of amplitude and phase position depending upon the condition of balance in said network.

15. In combination, a balanceable electrical network comprising a plurality of branches and a bridge arm interconnected therewith to have between its terminals a potential dependent upon the degree of electrical unbalance existing among said branches, a source of high frequency potential, means deriving from said source a first potential having a carrier frequency and a second potential comprising at least one pair of side bands of said carrier frequency, means for applying one of said derived potentials to said network, means for mixing the other derived potential with the potential from said bridge arm to produce a mixed voltage, together with demodulating means to retrieve from said mixed voltage a component equal in frequency to the difference between said carrier frequency and its nearest said pair of side bands and of amplitude and phase position depending upon the condition of balance in said network.

ABRAHAM WALTER JACOBSON.
ELLIOTT M. WHITNEY.

REFERENCES CITED

The following references are of record in the file of this patent:

UNITED STATES PATENTS

| Number | Name | Date |
|---|---|---|
| 2,039,405 | Green et al. | May 5, 1936 |
| 2,183,725 | Seeley | Dec. 19, 1939 |

March 23, 1948.　　　A. SIMMON　　　2,438,303
DEVICE FOR MAKING COLOR PRINTS
Filed Feb. 28, 1947　　　13 Sheets-Sheet 1
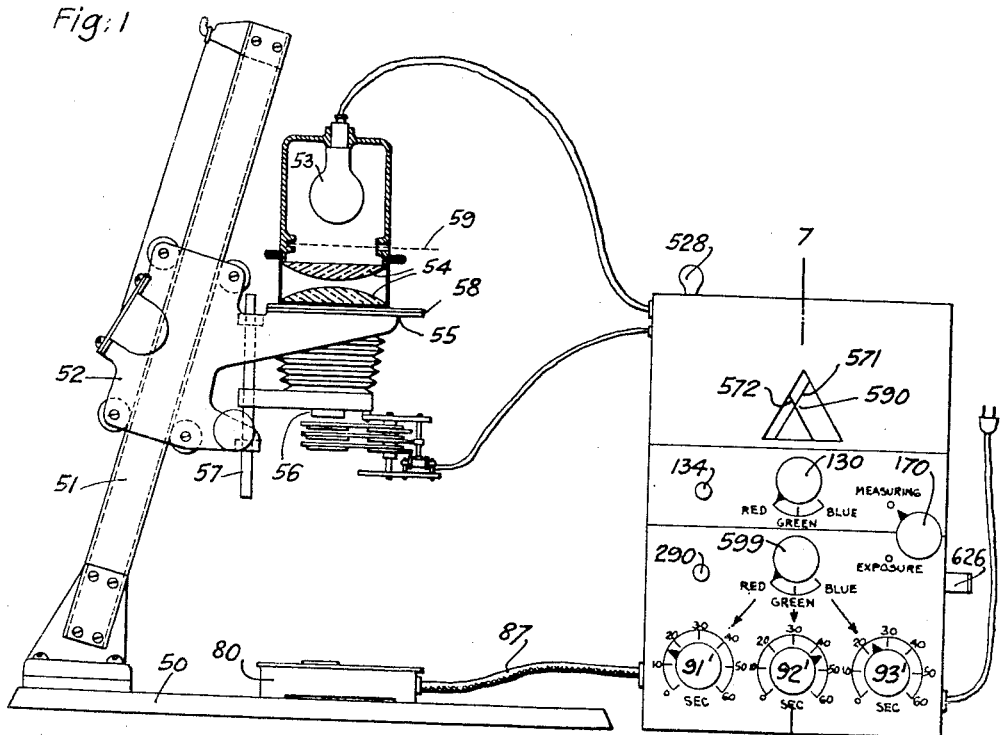
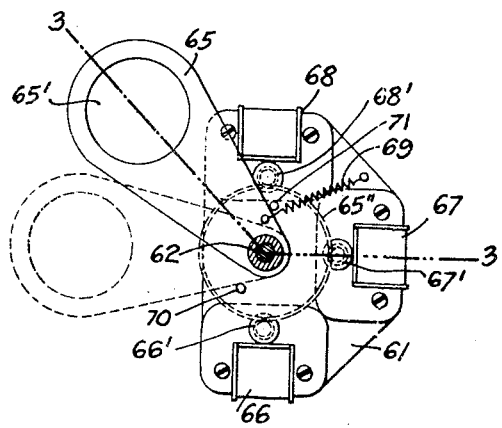
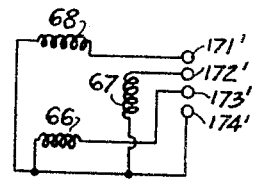
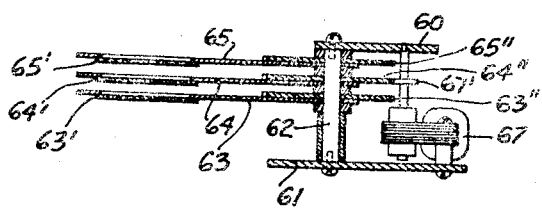
Alfred Simmon
INVENTOR.
BY Walter E. Wollheim
ATTORNEY